Dec. 9, 1952

B. D. LEE ET AL 2,620,890

SEISMIC PROSPECTING

Filed Dec. 1, 1947

INVENTORS.
BURTON D. LEE
GERHARD HERZOG
BY

ATTORNEY

Dec. 9, 1952    B. D. LEE ET AL    2,620,890
SEISMIC PROSPECTING
Filed Dec. 1, 1947    4 Sheets-Sheet 4

INVENTORS.
BURTON D. LEE
GERHARD HERZOG
BY
Daniel Stryker
ATTORNEY

Patented Dec. 9, 1952

2,620,890

UNITED STATES PATENT OFFICE 2,620,890

SEISMIC PROSPECTING

Burton D. Lee and Gerhard Herzog, Houston, Tex., assignors to The Texas Company, New York, N. Y., a corporation of Delaware Application December 1, 1947, Serial No. 788,988

6 Claims. (Cl. 181—0.5)

This invention relates to seismic prospecting and provides improvements in methods of and apparatus for seismic prospecting to the end that more accurate analysis of seismic waves may be obtained.

As disclosed in application Serial No. 753,541, filed June 9, 1947, seismic prospecting is usually conducted by firing an explosive charge at a shot point to produce seismic or acoustic waves that are picked up (usually after reflection from a formation interface in which a change in the velocity of the waves occurs) by a plurality of seismometers spaced from each other in the neighborhood of the shot point in any one of a number of patterns. Each seismometer is connected through an amplifier to recording means and the response of each seismometer is indicated as a separate trace on a moving medium by means of galvanometers or the like, the net result being a graph of vibration against time.

The firing of the shot produces seismic waves lying in a broad band of frequencies which collectively are referred to hereinafter as the "dynamite spectrum." Heretofore, it has been customary to filter out all but a narrow band of such frequencies, only the remaining frequencies being recorded. In effect, the rest of the "dynamite spectrum" is discarded. The results of seismic prospecting conducted in this fashion are dependent upon the choice of the frequencies which are recorded. In many cases this is largely a matter of chance for there is no way of accurately predicting in advance which particular frequencies in the "dynamite spectrum" will be more significant. Under conditions prevailing in seismic exploration, waves of different frequencies attenuate differently, so that waves of some frequencies give information regarding the subsurface which is not obtainable with waves of other frequencies. It is impractical to record separately in the field a large number of narrow frequency bands, because the apparatus required is too cumbersome for field use. Consequently, it has been the practice to record one or two or at the most three narrow frequency bands, the balance of the spectrum being in effect discarded by the filters or amplifiers which select the frequencies that are recorded.

In accordance with the present invention, the discard of possibly significant information is avoided in seismic prospecting by picking up a seismic vibration composed of a wide band of frequency components and recording this band without discrimination, i. e. without filtration. In this way the entire "dynamite spectrum" may be saved for subsequent analysis. For this purpose an electronic amplifier having a wide band pass may be employed. The record thus obtained is subsequently subjected to analysis by playing the record back to reproduce the waves of the wide frequency band. The reproduced wave form is then subjected to filtration to remove all but a selected narrower band of frequency components, these frequency components being re-recorded for interpretation purposes. In this way, all of the frequencies of the dynamite spectrum may be investigated separately from a single original record, and those of greatest significance discovered and interpreted.

If desired, a narrow band of troublesome frequencies (say those representing noise picked up by a seismometer from wind blowing on grass or from a fundamental or a harmonic of a power line frequency) may be removed from a record in accordance with the invention.

The play-back of the record and the wave analysis for the investigation of individual frequencies or frequency bands need not be and preferably are not conducted in the field. Instead, the undiscriminated record is taken in the field and the play-back and the analysis are conducted later in a laboratory employing special analysis apparatus.

The frequency components which are isolated by the play-back and filtration process just described may be recorded individually, or a number of such frequencies may be mixed prior to recording. If desired a number of different frequencies may be filtered out and re-recorded separately and simultaneously. Moreover, the individual waves of the chosen frequencies may be adjusted for phase-time differences as described in the aforementioned co-pending application, and may be separately amplified and re-corded individually or mixed.

It is common practice to spread seismometers on an area to be explored in various patterns. In a common pattern the seismometers or "pickups" are spaced from each other in a straight line extending outwardly from the shot point and numbered consecutively away from the shot-point. In such an arrangement, the output of pickups 1 and 2 may be added to produce trace 1, the outputs of pickups 2 and 3 added to produce trace 2, etc. In another type of mixing the output of pickups 1, 2 and 3 are added to produce a single trace, while the outputs of pickups 2, 3 and 4 are added to produce the second trace and so on. Many other possible arrangements have been suggested whereby the outputs of the individual pickups or groups of pickups are mixed. They all have the same objective, namely to produce a record in which recognition of reflected waves is facilitated. These arrangements work well in places where phase-time differences between the outputs of the pickups to be added are small, but when such time-phase differences are great the addition of the waves does not aid in recognition of significant reflections but on the contrary tends to obscure them. Thus, the trough of one wave may be added into the crest of another wave with resultant cancellation and obscuring of the record. Under field conditions it is difficult to predict the phase-time differences, but as disclosed in said co-pending application, it is possible to compensate accurately for phase-time differences if the records obtained in the field are re-recorded in the laboratory with accurate compensation of phase-time differences between traces, preferably employing separate amplification for the several traces that are combined so that the effect of a selecter trace may be emphasized as desired.

In the practice of the instant invention the reproduction and selection of frequencies to be investigated may be combined with accurate compensation for phase-time differences, with resultant improvement in interpretation of the records obtained.

In the practice of the instant invention satisfactory results can be obtained by recording the undifferentiated wave forms with a phonograph or with various photographic arrangements such as a camera and galvanometer combination or with apparatus such as that used in the production of sound film. Moreover, these original broad bands from the "dynamite spectrum" may also be recorded on magnetic media.

Magnetic recording systems in general have inherently poor low frequency response. This may be overcome by suitably compensated initial amplifiers, that is amplifiers which boost the low frequencies and have a falling response with increasing frequency. We prefer to overcome this difficulty by modulating a relatively high frequency carrier with the seismic waves. The modulated carrier wave is recorded, and in the playback operation demodulation is employed. Accordingly one aspect of the present invention involving the recording of the seismic waves as a trace on a magnetizable medium contemplates the improvement which comprises modulating a high frequency carrier wave with a seismic wave and recording the carrier wave thus modulated on the medium. It is within the purview of this invention to carry out such magnetic recording of seismic waves either with a wide band of frequencies or with a narrow band, for advantages accrue in both cases. If desired, analysis of the seismic waves may be accomplished by picking up and playing back the waves thus recorded, demodulating the wave thus picked up and producing the demodulated wave for inspection. When a number of waves are recorded side by side as traces on a magnetizable medium and played back simultaneously phase-time difference compensation may be accomplished during the re-recording operation.

In recording seismic waves, it is desirable to employ some type of amplitude limiting amplifier ahead of the recording unit to avoid overloading the recording medium, with consequent distortion or also avoid excessive amplitudes which make observation of the traces difficult. In the preferred form of our apparatus an automatic gain control amplifier is disposed between the seismometer and the recording medium.

The foregoing and other aspects of our invention will be clear in the light of the following detailed description taken in conjunction with the accompanying drawings in which.

Figure 1:
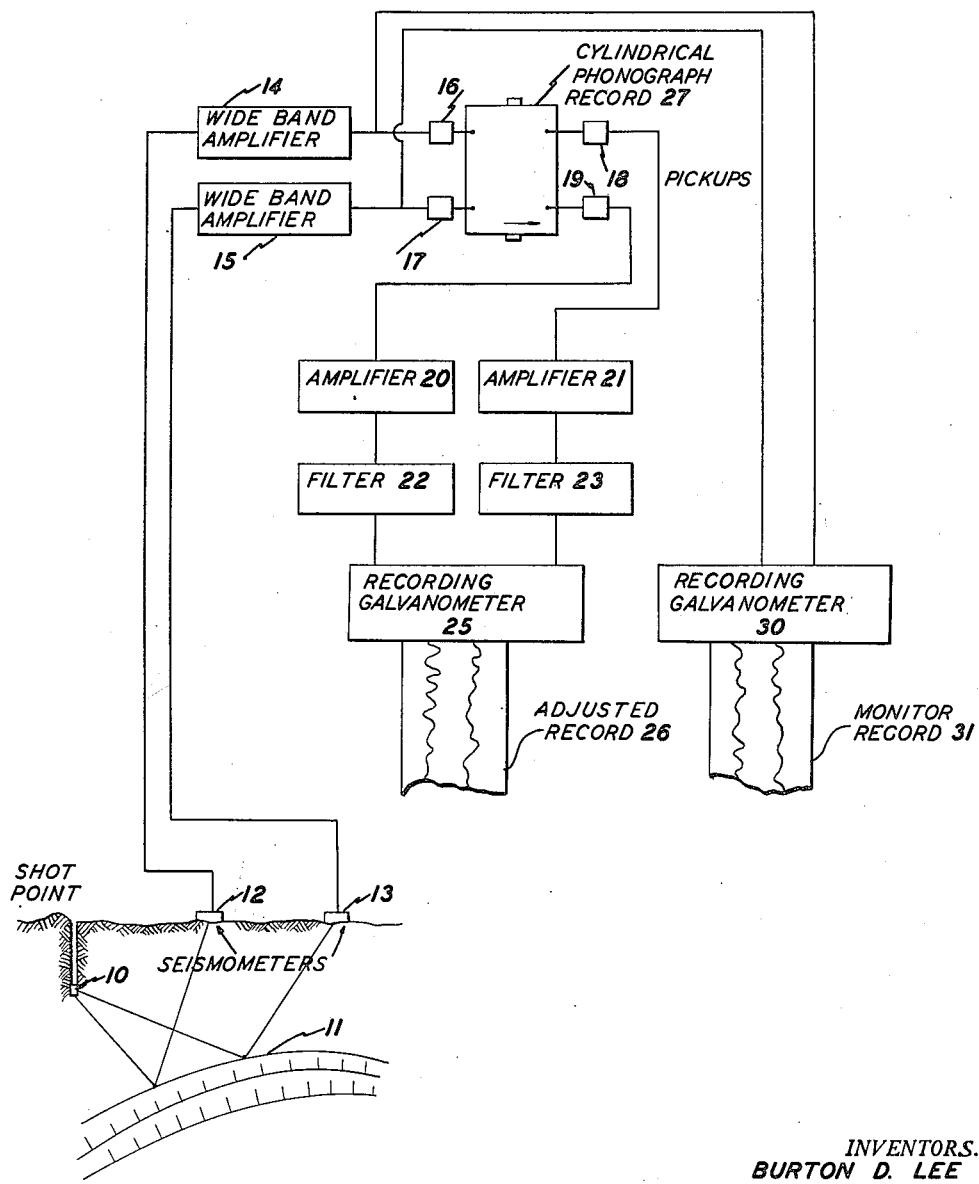
Fig. 1 is a block diagram of a simple form of apparatus of our invention for recording waves having a wide band of frequency components and subsequently analyzing the waves by selecting certain narrow frequency bands for re-recording and study.

Referring to Fig. 1, an explosive charge 10 when fired at a shot point in a drill hole in the earth produces seismic waves which are reflected from an underlying reflection horizon 11 to a pair of seismometers 12, 13 disposed on the surface of the ground. The seismometers are connected respectively to the inputs of wide band vacuum tube A. G. C. amplifiers 14, 15 the outputs of which are connected respectively to engraving heads 16, 17. These heads cut records of the compound seismic wave forms (including all the frequencies of the passed band) on a cylindrical phonograph record 27, which is rotated at constant speed during the period of reception. Either at the time the original record is made in the field or preferably later in the laboratory, the original records of the waves passed by the wide band amplifiers are picked up by a pair of conventional phonograph pickups 18, 19. The waves thus picked up are individually amplified in electronic amplifiers 20, 21 which may be tuned to any desired frequency and either sharply or so as to pass a frequency band, by conventional individual filters 22, 23, which in practice are integral parts of the associated amplifiers. The frequencies passing the filters are recorded separately by a conventional recording galvanometer 25 which contains a moving photographic film and galvanometers which expose the film to oscillating light beams. The recording galvanometer thus produces an adjusted record 26 of selected frequency components of the original dynamite spectrum picked up by the seismometers and passed by the wide band amplifiers to the original record.

To assure that the apparatus employed in the field is operating satisfactorily, it is desirable to produce a monitor record of the response of the seismometers in the field, this being accomplished by a second recording galvanometer 30 which is connected to the outputs of the two wide band amplifiers and which produces for inspection the original compound wave forms as separate traces on a so-called monitor record 31.

To summarize the operation of the apparatus of Fig. 1, the dynamite charge is fired at the shot point and reflected waves originating at the shot point are picked up by the two seismometers. These waves each contain a wide band of frequency components and the amplifiers are adjusted to pass these components to the recording heads 16, 17. The original record 27 therefore comprises a pair of traces disposed side by side as spirals on a cylinder and containing substantially all the frequencies of the dynamite spectrum. In the re-recording operation all the frequency components are picked up, but only certain frequencies are re-recorded. By playing the original record back a number of times and adjusting the filters to pass different frequencies each time, the entire spectrum may be investigated and frequencies of greatest significance selected for study.

The monitor record 31 which is obtained in the field with the recording galvanometer 30 is, as indicated hereinbefore, primarily taken to assure that the field apparatus is in proper working order. However, it has further utility in that it shows the form of the original compound waves containing all the frequency components passed by the wide band amplifiers.

Figure 2:
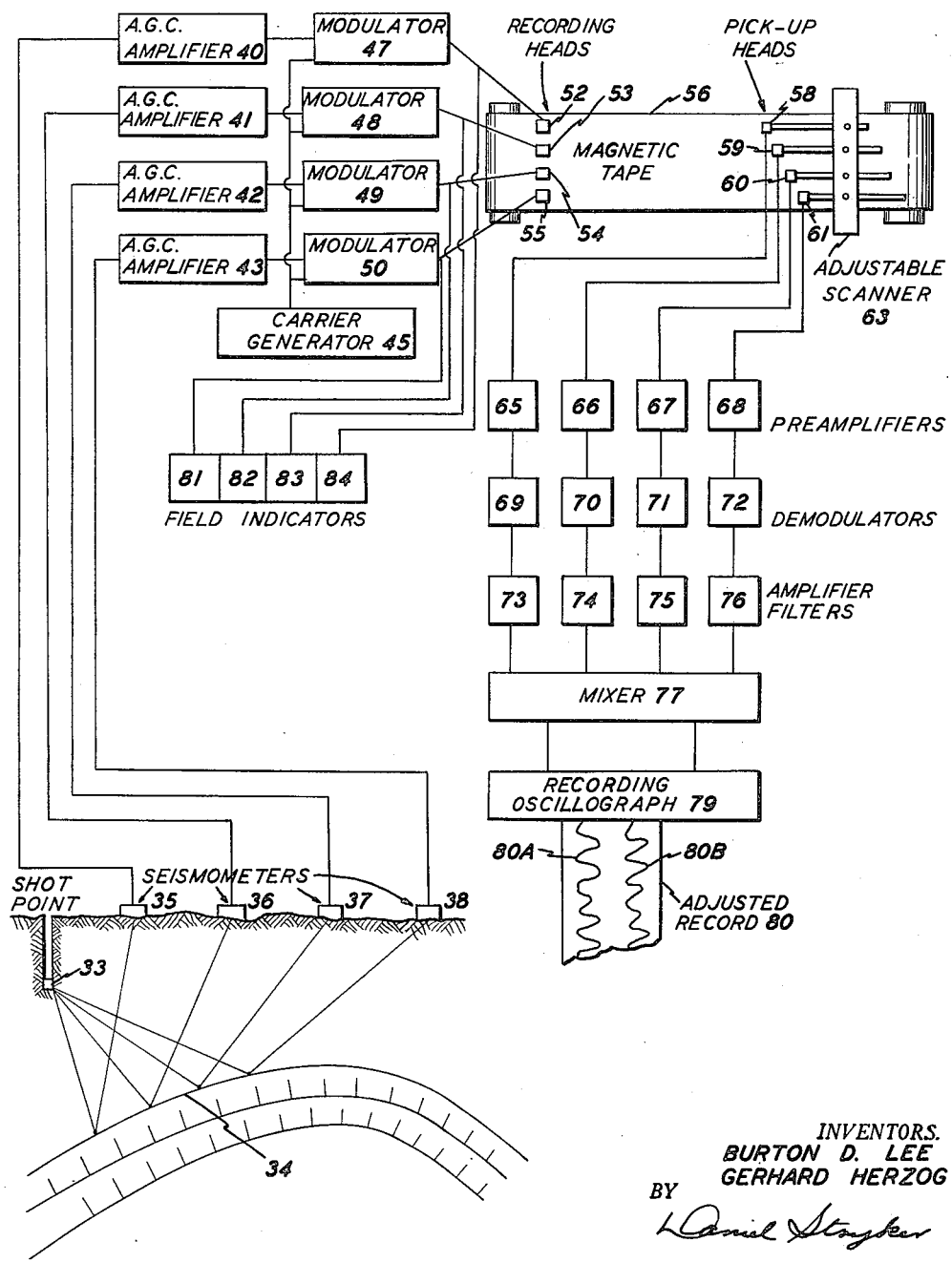
Fig. 2 is a block diagram of a modification of our invention employing a magnetic medium for recording a plurality of seismic waves, re-recording being accomplished with compensation for phase-time differences, and with filtration to select certain frequency components for study.

In the apparatus of Fig. 1, the seismic waves are recorded phonographically and then picked and re-recorded with amplification and filtration, but without any adjustment for any possible phase-time differences between traces. The apparatus of Fig. 2 is designed to make the original record on a magnetic medium, the re-recording operation being conducted, if desired, with compensation for phase-time differences and with other refinements including the "mixing" of traces to aid in analysis of the information obtained. To consider Fig. 2 in detail, an explosive charge 33 is fired at a shot hole in the earth and reflected seismic waves from a reflecting interface 34 are received at a plurality of seismometers 35, 36, 37, 38 spaced along a line extending away from the shot point. The waves picked up by the individual seismometers are individually amplified by automatic gain control amplifiers 40, 41, 42, 43, the seismometers being connected respectively to the input of these amplifiers. A high frequency carrier wave is produced by a carrier generator 45 and the high frequency wave (of say 5–10 kilocycles per second) thus produced is sent to a plurality of modulators 47, 48, 49, 50, each connected respectively to the output of one of the amplifiers. In this way, the high frequency carrier is modulated by the seismic waves passing the automatic gain control amplifiers, all of which may be of wide band pass so that the seismic waves employed for modulation purposes contain a great variety of frequency components and if desired the entire dynamite spectrum. The modulated high frequency carrier waves in each case are employed to operate recording heads 52, 53, 54, 55 disposed adjacent a conventional magnetic tape which moves at uniform speed past the recording heads. The seismic waves are thereby recorded as individual traces side by side on the tape 56.

The magnetic traces thus produced are subsequently subjected to re-recording. Thus the magnetic tape may be transferred to the laboratory and subjected to the play-back, each trace being picked up by an individual pickup head, 58, 59, 60, 61. These pickup heads are fastened to an adjustable scanner 63. The heads may be moved lengthwise with respect to the trace to compensate for phase-time differences between traces. The waves picked up by the heads are individually amplified by preamplifiers 65, 66, 67, 68 connected respectively to the pickup heads. The amplified wave in each case is then demodulated respectively in demodulators 69, 70, 71, 72 and then subjected to further amplification, with filtration in the amplifier-filter combinations 73, 74, 75, 76. This second set of amplifiers is adjusted to pass components of preselected frequencies. The output of these amplifiers is sent to a conventional mixer 77 and the output of the mixer is sent to a conventional oscillograph 79 which produces an adjusted record 80. Thus the output of amplifiers 73, 74 may be mixed to produce a first adjusted trace 80A, while the outputs of the second pair of amplifiers 75, 76 may be mixed to produce a second trace 80B.

To assure that each channel of the seismometer system is operating properly in the field, indicators 81, 82, 83, 84 (say oscilloscopes or a multi-trace recording oscillograph), may be connected to the outputs of the modulators 47, 48, 49, 50 so as to give prompt indication of instrument trouble.

Figure 3:
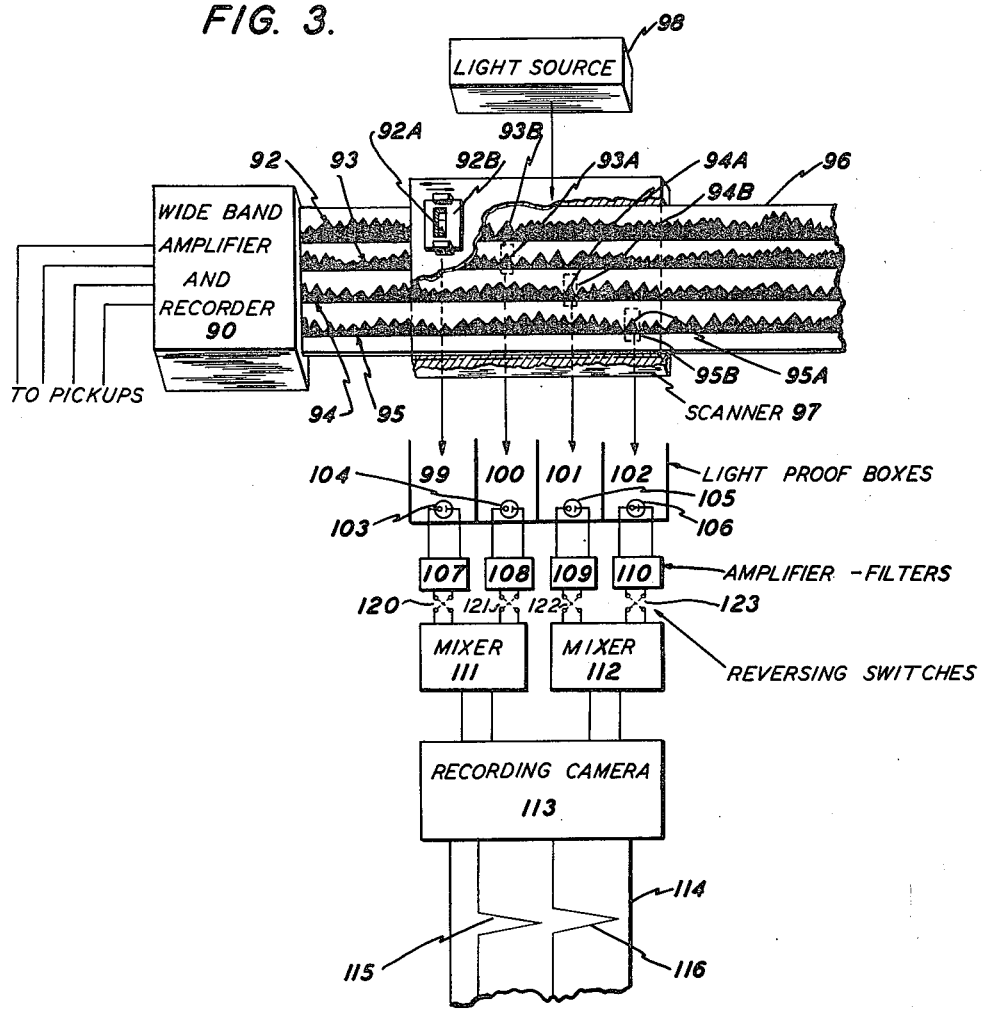
Fig. 3 is a schematic diagram illustrating a further modification of the apparatus of our invention in which original compound seismic waves are recorded on sound film and subsequently re-recorded with frequency discrimination and with phase-time difference compensation if desired.

Although magnetic recording exemplifies a preferred practice of the invention, because of the low price of the apparatus required, the recording may be accomplished by photographic means as illustrated in Fig. 3. The apparatus of this figure employs a multi-channel wide band amplifier and recorder 90 into which the currents from the plurality of seismometers are fed and individually amplified and recorded as traces 92, 93, 94, 95. These traces are bands of varying height and variations in wave amplitude are recorded as variations in height of the band. Thus peaks 92A, 93A, 94A, 95A corresponding to each other and representative of a single reflecting horizon (but displaced from each other by phase-time differences due to the geometry of the field pattern of the pickups) are recorded. During recording and re-recording the film 96 on which the traces are formed moves lengthwise at substantially constant speed.

At some later time, after development, for example in the laboratory, the film is passed through an adjustable scanner 97. This scanner is a mask along which the primary record travels lengthwise. It is provided with a number of windows or slits 92B, 93B, 94B, 95B spaced so that the several traces pass respectively past the slits. The slits are adjustable along the length of the traces as indicated so that their position may be adjusted to correspond to matching peaks on the several traces. When this has been accomplished, light from a source 98 is passed through the juxtaposed film and scanner and issues on the other side. The film is moved longitudinally with respect to the scanner and the light passing through each slit varies as the respective trace. The individual light beams passing through the scanner go into a series of light proof boxes 99, 100, 101, 102 provided respectively with photocells 103, 104, 105, 106. The individual photocells are in turn connected to the input of individual amplifiers 107, 108, 109, 110. These amplifiers may be tuned to pass any particular frequency or band of frequencies by adjustable filters (not shown) but incorporated in the respective amplifier circuits. The outputs of the amplifiers are supplied to a mixer. In the example illustrated by Fig. 3 one mixer circuit 111 may be employed to combine the output of the amplifiers 107, 108, and a second mixer circuit 112 may be employed to combine the output of amplifiers 109, 110. The outputs of the mixer circuits are fed to a recording camera type multi-trace galvanometer 113 through which a film 114 is passed in synchronization with the passage of the primary film 96 through the scanner. In this way a pair of traces 115, 116 are produced on a secondary record or film 114. The trace 115 is representative of the sum of the individual traces 92, 93 on the primary record while the other trace 116 represents the addition of the primary traces 94, 95, compensation having been made for phase-time differences.

If desired, the gains of the individual amplifiers between photocells and mixer may be adjusted individually. For example, it may be desirable to add only half the amplitude of one of the original traces to the full amplitude of another.

In the operation of the apparatus of Fig. 3, the currents from the several seismometers or pickups represent the dynamite spectrum as picked up at the several field locations. These wide band compound waves are recorded on the primary film 96 and subsequently subjected to analysis. The analysis may involve phase-time compensation employing the scanner, and it may also involve frequency discrimination through the tuning of the amplifier-filter combination. Analysis of the compound waves thus recorded on the primary record may be complete. Thus the primary record may be run through the re-recording apparatus any number of times, with or without phase-time difference compensation and with the amplifier-filter combinations of the re-recording apparatus tuned to any particular frequency or frequency band which is to be investigated. The most significant frequencies originally picked up may thus be isolated and investigated either individually or with any desired mixing schedule.

It may be desirable to reverse a given trace in the re-recording process. This can be accomplished in the apparatus of Fig. 3 with the reversing switches 120, 121, 122, 123 interposed in each case between the individual amplifiers and the mixer. Thus any wave may be reversed (so that its crest becomes its trough) prior to mixing. This may be done to correct for improper field connections, etc.

Figure 4:
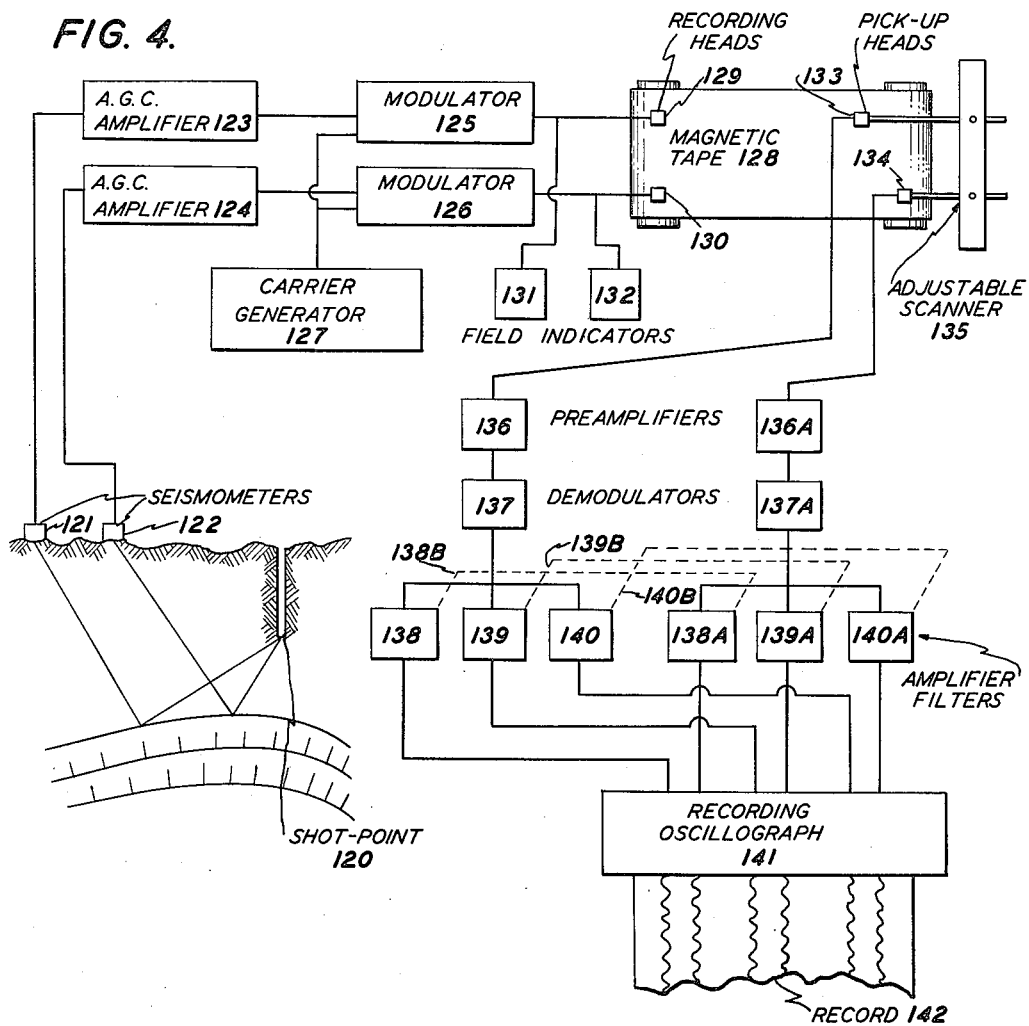
Fig. 4 is a schematic drawing illustrating a form of the apparatus of the invention provided with multiple re-recording channels so that a plurality of frequency bands from an original record may be isolated and analyzed simultaneously.

The apparatus of Fig. 4 is similar to that of Fig. 2, except that it provides for simultaneously picking up and re-recording a plurality of different frequency bands of the original dynamite spectrum. This is desirable in many cases, since it makes for more rapid analysis and interpretation of survey results. In the apparatus of Fig. 4, vibrations originating at a shot point 120 are picked up by seismometers 121, 122 and sent respectively to automatic gain control amplifiers 123, 124. The outputs of the individual amplifiers are employed respectively to modulate a high frequency carrier wave in modulators 125, 126, the carrier being supplied by a generator 127. The modulated waves in each case are recorded on a magnetic tape 128 by recording heads 129, 130 connected respectively to the outputs of the modulators. Thus longitudinal parallel magnetized traces of the two waves are formed on the tape. At the same time the waves are transmitted respectively to a pair of field indicators 131, 132, the primary purpose of this operation being to assure that the field equipment is operating.

In a subsequent wave analysis operation, the magnetic tape is run past a pair of pickup heads 133, 134, mounted respectively on an adjustable scanner 135. The respective waves are thus picked up by two separate analyzer circuits. Each circuit contains a preamplifier 136, 136A followed by a demodulator 137, 137A the output of which is connected to three amplifier-filters 138, 139, 140, 138A, 139A, 140A each of which may be tuned individually both with respect to band width and band position. The output of the six amplifier filters is connected to a multi-trace recording oscillograph 141 which produces a record 142.

The operation of the apparatus of Fig. 4 is the same as that of Fig. 2, except that a plurality of amplifier-filters is employed for the analysis of the individual original wave forms, so that various frequency bands may be investigated simultaneously. Thus the amplifiers 138, 138A may be tuned to the same narrow high frequency band, the amplifiers 140, 140A to a narrow band of low frequency, and the amplifiers 139, 139A to a narrow band of intermediate frequency, the outputs of each pair being recorded side by side on the record for comparative purposes.

For convenience, each of the foregoing pairs of amplifier-filters may be provided with common control means 138B, 139B, 140B, so that each may be tuned in simultaneously to a common frequency band, the control means being such that the breadth of band and its position in the frequency spectrum may be adjusted.

Figure 5:
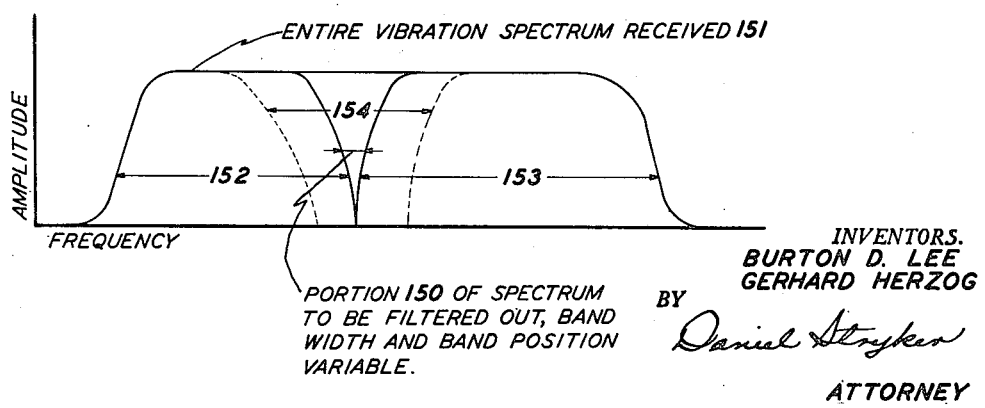
Fig. 5 is a diagram illustrating the application of the invention for the elimination of noise in record analysis.

The apparatus of Fig. 4, in addition to permitting simultaneous re-recording of a number of frequency bands, has the advantage that it permits undesirable noise to be filtered out of a record. As indicated above, troublesome frequencies due to noise, such as that due to power line frequencies or to wind blowing on grass, are picked up by the seismometers. Such a narrow frequency band 150 is indicated on Fig. 5, in its relation to the entire vibration spectrum 151 received. It may be eliminated by tuning the amplifier-filter 138, for example, to pass the portion 152 of the spectrum, while the filter 139 is tuned to pass the portion 153 of the spectrum. The portions thus passed may be recorded separately or mixed, for example as in Fig. 2. To increase the width of the filtered out portion say to that of the dotted section 154, the filters 138 and 139 are adjusted to reject this larger band. It will also be plain that the position of the rejected band as well as its width may be regulated by this means.

The invention makes possible a much more thorough investigation of seismic phenomena than has been practicable heretofore. Subterranean structures such as anticlines which may contain petroleum frequently have remained undiscovered, because the seismic prospecting operation has been limited to the investigation of only a few frequencies. Since, as already indicated, various frequency components may attenuate at different rates and may also vary with respect to other characteristics, it is largely a matter of chance in a given case that the frequencies chosen for investigation are the most significant. The instant invention permits marked economies in seismic prospecting since in a given field investigation, a record of the entire dynamite spectrum is obtained at once with subsequent analysis and investigation of individual frequencies being accomplished in a laboratory under more careful conditions than those obtaining in the field.

It should be emphasized that the application of magnetic recording to seismic prospecting in accordance with the invention may be practiced with filtration ahead of the magnetic recorder, if conventional field practice is preferred. Irrespective of the type of field practice and whether wide band recordings (say 15 to 3000 cycles per second) or narrow recordings are obtained the invention in its magnetic recording aspect offers a number of advantages among which are (a) faithful reproduction of amplitude and frequency characterstics of the output waves of the several seismometers (b) a common base material for the several magnetic traces so as to permit measurement of time differences between the separate traces to a high degre of accuracy, say to within $\frac{1}{10,000}$ of a second or better, and (c) a reproducing system affording simultaneous play-back of all channels with the individual pickups for play-back capable of accurate indexing along the record and adjustable for correcting time differences due to "weathering" and elevation differences as well as to phase-time differences resulting from the geometry of the spread.

The relatively high frequency carrier which is modulated by the seismic wave prior to recording in order to overcome the inherently low frequency response of the magnetic recording system may be either amplitude or frequency modulated, the re-recording system having the necessary demodulating arrangements.

We claim:

1. In apparatus for recording a seismic wave including a seismometer, the combination which comprises a magnetizable medium, an automatic gain control amplifier connected to the output of the seismometer, a modulator connected to the output of the amplifier for modulating a high frequency carrier with the amplified seismic wave, means for recording the resulting modulated carrier wave as a magnetic trace on the magnetizable medium, means for picking up the modulated carrier wave from the medium, means for demodulating the picked up wave, means for filtering the demodulated wave to eliminate all but a preselected band of seismic frequencies, and means for reproducing the picked up filtered wave for inspection.

2. In apparatus for recording and analyzing a plurality of seismic waves originating in a common disturbance and including a plurality of seismometers capable of picking up vibrations of low seismic frequency and spaced from each other to pick up the respective waves including low frequency seismic components with phase-time difference between them, the combination which comprises a magnetizable medium, means for modulating separately a high frequency carrier wave with the output of each seismometer including low frequency seismic components to produce a corresponding plurality of modulated carrier waves, means for recording the modulated carrier waves as magnetic traces side by side and simultaneously on the magnetizable medium, individual pickups disposed respectively on the traces for picking up the modulated waves from the traces, means for compensating for the phase-time difference between the modulated waves on the traces, means for demodulating the individual waves picked up, means for filtering the demodulated picked-up waves to exclude all but a pre-selected band of seismic frequencies, and means for producing the demodulated filtered waves for inspection.

3. In apparatus for recording and analyzing a plurality of seismic waves originating in a common disturbance and including a plurality of seismometers spaced from each other to pick up the respective waves including low frequency seismic components with phase-time difference between them, the combination which comprises a magnetizable medium, means for modulating separately a high frequency carrier wave with the output of each seismometer including the low frequency seismic components to produce a corresponding plurality of modulated carrier waves, means for recording the modulated carrier waves as magnetic traces side by side and simultaneously on the magnetizable medium, individual pickups disposed respectively on the traces for picking up the modulated waves, means for varying the position of the individual pickups lengthwise along the traces to compensate for the phase-time difference, means for demodulating the individual waves thus picked up, means for filtering the demodulated picked up waves to exclude all but a pre-selected band of seismic frequencies, and means for producing the demodulated filtered waves as traces side by side on a record with the phase-time difference eliminated.

4. In apparatus for recording and analyzing a plurality of seismic waves originating in a common disturbance and including a plurality of seismometers capable of picking up low frequency seismic components and spaced from each other to pick up the respective waves including the low frequency seismic components with phase-time difference between them, the combination which comprises a magnetizable medium, means for modulating separately a high frequency carrier wave with the output of each seismometer including the low frequency seismic components to produce a corresponding plurality of modulated carrier waves, means for recording the modulated carrier waves as magnetic traces side by side and simultaneously on the magnetizable medium, individual pickups disposed respectively on the traces for picking up the modulated waves therefrom, means for varying the position of the individual pickups lengthwise along the traces to compensate for the phase-time difference, means for demodulating the individual waves picked up, means for filtering the demodulated waves to exclude all but a pre-selected band of seismic frequencies, means for mixing the filtered waves, and means for producing the mixed waves for inspection.

5. In apparatus for recording a seismic wave, the combination which comprises a seismometer capable of picking up seismic waves in a wide frequency band including low seismic frequencies, a magnetizable medium, a modulator for modulating a high frequency carrier with the output of the seismometer including the low frequency seismic components, means for recording the resulting modulated carrier wave as a magnetic trace on the magnetizable medium, means for picking up the modulated carrier wave from the medium, means for demodulating the picked up wave, means for filtering the demodulated wave to eliminate all but a preselected band of seismic frequencies and means for reproducing the filtered wave for inspection.

6. In apparatus for recording a seismic wave, the combination which comprises a seismometer capable of picking up seismic waves on a wide frequency band including low seismic frequencies, a magnetizable medium, a wide band amplifier connected to the output of the seismometer, a modulator connected to the output of the amplifier for modulating a high frequency carrier with the amplified output of the seismometer, means for recording the resulting modulated carrier wave as a magnetic trace on the magnetizable medium, means for picking up the modulated carrier wave from the medium, means for demodulating the picked up wave, means for filtering the demodulated wave to eliminate all but a pre-selected band of seismic frequencies and means for reproducing the filtered wave for inspection.

BURTON D. LEE.
GERHARD HERZOG.

REFERENCES CITED

The following references are of record in the file of this patent:

UNITED STATES PATENTS

| Number | Name | Date |
|---|---|---|
| 2,144,812 | Rieber | Jan. 24, 1939 |
| 2,243,729 | Ellis | May 27, 1941 |
| 2,378,389 | Begun | June 19, 1945 |
| 2,394,990 | Eisler et al. | Feb. 19, 1946 |
| 2,395,289 | Neufeld | Feb. 19, 1946 |
| 2,427,421 | Rieber | Sept. 16, 1947 |
| 2,436,503 | Cleveland | Feb. 24, 1948 |
| 2,441,065 | Green | May 4, 1948 |